United States Patent
Chippa et al.

(10) Patent No.: US 10,291,553 B2
(45) Date of Patent: May 14, 2019

(54) LOGICAL SWITCH ARCHITECTURE FOR NETWORK VIRTUALIZATION

(71) Applicant: Lenovo Enterprise Solutions (Singapore) Pte. Ltd., Singapore (SG)

(72) Inventors: Ashok N. Chippa, Mountain View, CA (US); Vipin K. Garg, Sunnyvale, CA (US); Dar-Ren Leu, San Jose, CA (US); Vijoy A. Pandey, San Jose, CA (US); Daljeet Singh, Watsonville, CA (US); Ethan M. Spiegel, Mountain View, CA (US); Robert E. Zagst, Jr., San Jose, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 474 days.

(21) Appl. No.: 14/270,716

(22) Filed: May 6, 2014

(65) Prior Publication Data
US 2015/0326505 A1    Nov. 12, 2015

(51) Int. Cl.
| | | |
|---|---|---|
| G06F 9/455 | (2018.01) | |
| H04L 12/24 | (2006.01) | |
| H04L 12/46 | (2006.01) | |
| H04L 29/08 | (2006.01) | |
| H04L 12/701 | (2013.01) | |
| H04L 12/713 | (2013.01) | |
| H04L 12/773 | (2013.01) | |
| H04L 12/931 | (2013.01) | |

(52) U.S. Cl.
CPC .......... *H04L 49/70* (2013.01); *G06F 9/45533* (2013.01); *H04L 12/4641* (2013.01); *H04L 41/5054* (2013.01); *H04L 45/00* (2013.01); *H04L 45/586* (2013.01); *H04L 45/60* (2013.01); *H04L 49/354* (2013.01); *H04L 67/10* (2013.01)

(58) Field of Classification Search
CPC ... H04L 45/00; H04L 45/586; H04L 12/4641; H04L 45/60; G06F 9/45533
See application file for complete search history.

(56) References Cited

U.S. PATENT DOCUMENTS

| | | | | |
|---|---|---|---|---|
| 5,550,816 | A * | 8/1996 | Hardwick | H04L 12/4604 370/397 |
| 6,850,495 | B1 * | 2/2005 | Baum | H04L 12/4641 370/256 |
| 7,178,052 | B2 | 2/2007 | Hebbar et al. | |
| 8,938,516 | B1 * | 1/2015 | Thathapudi | H04L 12/4641 709/208 |
| 9,450,823 | B2 * | 9/2016 | Arora | H04L 41/082 |
| 2008/0028157 | A1 * | 1/2008 | Steinmetz | G06F 13/426 711/149 |
| 2010/0290472 | A1 * | 11/2010 | Raman | H04L 45/00 370/395.2 |

(Continued)

*Primary Examiner* — George C Neurauter, Jr.
(74) *Attorney, Agent, or Firm* — Zilka-Kotab, P.C.

(57) ABSTRACT

A tool for partitioning a switch into one or more logical switches in a distributed system. The tool creates, by one or more computer processors, one or more logical switch routers, based, at least in part, on a user configuration. The tool assigns, by one or more computer processors, based, at least in part, on a user configuration, one or more ports to the one or more logical switch routers. The tool manages, by one or more computer processors, the one or more logical switch routers.

20 Claims, 8 Drawing Sheets

(56) References Cited

U.S. PATENT DOCUMENTS

| | | |
|---|---|---|
| 2012/0027018 A1 | 2/2012 | Ilyadis |
| 2012/0155461 A1 | 6/2012 | Kim et al. |
| 2012/0230325 A1* | 9/2012 | Haddock ............ H04L 12/4633 370/357 |
| 2013/0060940 A1 | 3/2013 | Koponen et al. |
| 2013/0227153 A1* | 8/2013 | Zurmuehl ............ G06F 9/5055 709/228 |
| 2014/0123135 A1* | 5/2014 | Huang ................ H04L 41/5054 718/1 |
| 2014/0130044 A1* | 5/2014 | Zhang ................ G06F 9/45533 718/1 |
| 2014/0146823 A1* | 5/2014 | Angst ................ H04L 12/4675 370/401 |
| 2014/0233568 A1* | 8/2014 | Dong ...................... G06F 13/00 370/392 |
| 2014/0241353 A1* | 8/2014 | Zhang ...................... H04L 45/74 370/390 |
| 2015/0043378 A1* | 2/2015 | Bardgett ............ H04L 12/4641 370/254 |
| 2015/0052262 A1* | 2/2015 | Chanda ............... H04L 61/2015 709/245 |
| 2015/0052524 A1* | 2/2015 | Raghu .................... G06F 9/455 718/1 |
| 2015/0052614 A1* | 2/2015 | Crowell ................ G06F 21/566 726/25 |

\* cited by examiner

LOGICAL SWITCH ARCHITECTURE FOR NETWORK VIRTUALIZATION

FIELD OF THE INVENTION

The present invention relates generally to network virtualization, and more particularly to a logical switch architecture for network virtualization.

BACKGROUND OF THE INVENTION

In computing, network virtualization is a method used to combine hardware and software network resources and network functionality into a single, software based administrative platform, known as a virtual network. Network virtualization is achieved through software and services that allow the sharing of storage, bandwidth, applications, and other network resources. The technology utilizes a method similar to the virtualization process used to simulate virtual machines within physical computers (i.e., server virtualization). A virtual network treats all hardware and software in the network as a single collection of resources, which can be accessed regardless of physical boundaries. In simple terms, network virtualization allows each authorized user to share network resources from a single computer.

Network virtualization facilitates customization and ease of network use. Virtualization can provide customized access that allows administrators to allocate critical network services, such as bandwidth throttling and quality of service (QoS). It can also provide consolidation by allowing a multitude of physical networks to be combined into a single virtual network, allowing for streamlined and simplified management.

SUMMARY

Aspects of the present invention disclose a method, system, and computer program product for a logical switch architecture for network virtualization. The computer system includes a software module configurable to manage one or more logical switch routers in the logical switch architecture. The computer system includes a software module configurable to duplicate the logical switch architecture on one or more switches in a network of switches. The computer system includes a software module configurable to coordinate ownership of one or more physical ports and one or more virtual ports to the one or more logical switch routers with the logical switch architecture. The computer system includes a software module configurable to coordinate resources across the one or more logical switch routers within the logical switch architecture.

DETAILED DESCRIPTION

Figure 1:
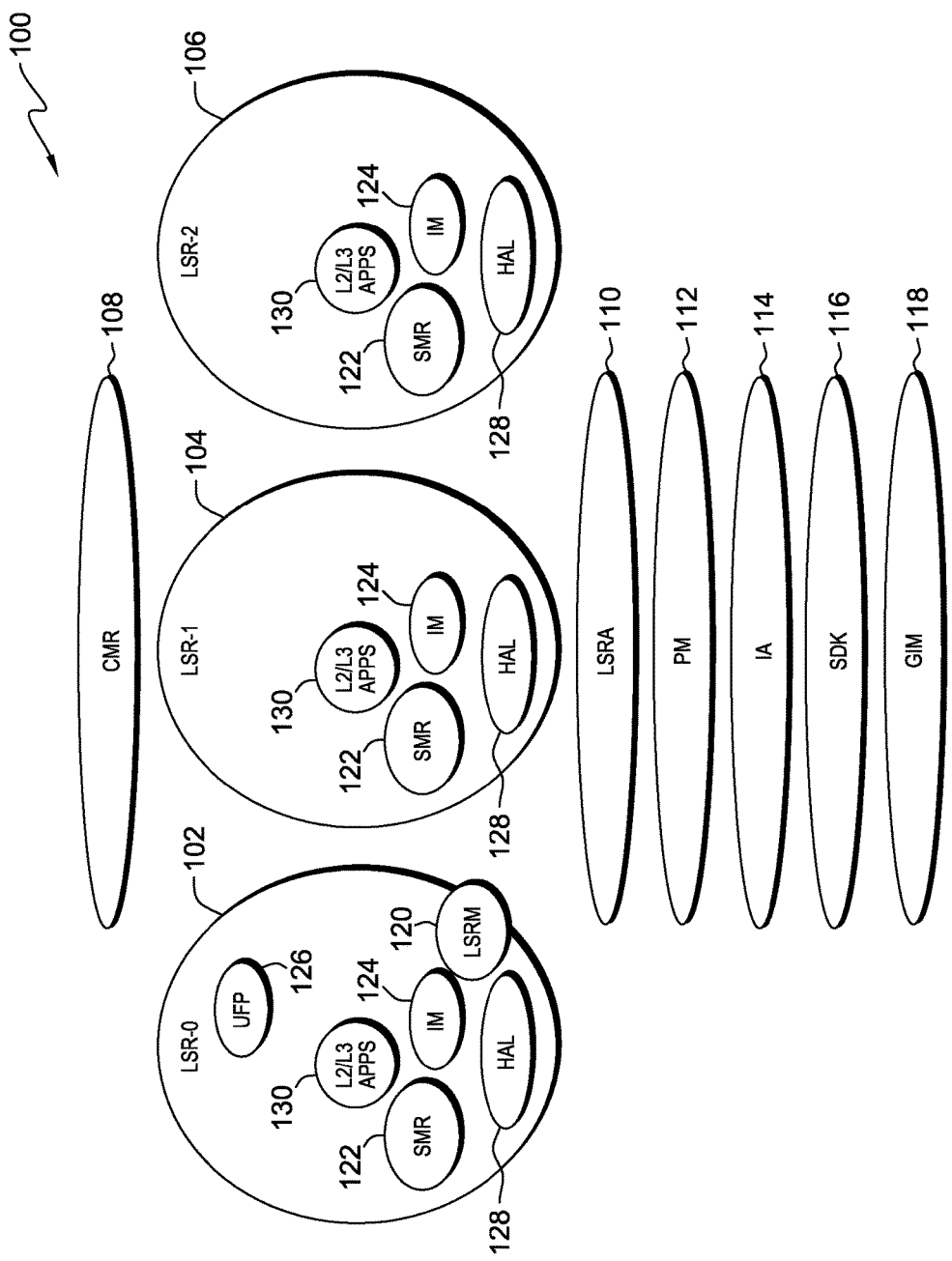
FIG. 1 illustrates a logical switch router (LSR) architecture within a data processing system, generally designated 100, in accordance with an embodiment of the present invention.

Embodiments of the present invention provide the capability to partition a switch into multiple logical switches using a logical switch router (LSR) multi-tenancy architecture. Embodiments of the present invention provide the capability to partition a data plane, control plane, and management plane. Embodiments of the present invention provide the capability to support process independence and fault isolation among one or more LSRs on a single switch.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to Figures. FIG. 1 illustrates a logical switch router (LSR) architecture within a data processing system, generally designated 100, including a default logical switch router (LSR-0) 102, multiple non-default logical switch routers (LSR-1, LSR-2, etc.), such as LSR-1 104 and LSR-2 106, a configuration, management, and reporting client (CMR) 108, a logical switch router agent (LSRA) 110, a port manager (PM) 112, an interface agent (IA) 114, a software development kit (SDK) 116, a global index manager (GIM) 118, and a logical switch router manager (LSRM) 120.

In the exemplary embodiment, LSR-0 102 is an administrative logical switch router initially created by the networking system. LSR-0 102 cannot be deleted, and is responsible for managing non-default logical switch routers, such as LSR-1 104 and LSR-2 106. In the exemplary embodiment, the LSR environment is port/virtual port (vport) based, such that each port/vport can belong to only one LSR. All physical ports belong to LSR-0 102 until assigned to one or more non-default logical switch routers, such as LSR-1 104 and LSR-2 106. Initially, vports will not be present in the LSR environment. Vports are created by user configuration or via protocol negotiation.

In the exemplary embodiment, LSR-0 102 includes LSRM 120, a key process, operating on the master (as well as the backup) switch, responsible for LSR management, including hardware resource (e.g., port) assignment and management, a service manager (SMR) 122, a software module responsible for launch and monitoring of software processes, CMR 108, a command line interface responsible for user management of LSRs and processing user requests, an interface manager (IM) 124, a universal fiber port (UFP) 126, a hardware abstraction layer (HAL) 128, and L2 and L3 level applications (apps) 130. On the data plane, there is no direct communication between two LSRs on the same switch. Communication between two LSRs on the same switch is possible through external connectivity.

In the exemplary embodiment, SMR 122 is one instance per LSR. SMR 122 launches all software processes with each LSR via a configuration file associated with each process (e.g., application). In each LSR, processes can be launched automatically or launched by user configuration, i.e., CMR 108 signals SMR 122 when a user request is issued. SMR 122 launches processes as defined by the configuration file associated with the process. For example, if a process is implemented in a distributed way, and is launched per user configuration, SMR 122 sends the request to all other switches to launch the process in a particular LSR. Policies for monitoring and restart are defined per process.

In the exemplary embodiment, IM 124 is a software module capable of handling logical interface (LIF) related management. A LIF can represent a physical interface, a virtual interface, a port-channel, arouted virtual interface (RVI), a loopback, etc. A LIF database in shared memory (not shown) is maintained in IM 124. In the exemplary embodiment, one instance of IM 124 operates within each LSR in the LSR environment.

In the exemplary embodiment, UFP 126 is a universal arbitrated fiber port used to communicate with and connect to ports or other devices included within a LSR system.

In the exemplary embodiment, HAL 128 is a software module responsible for hardware programming in the LSR environment. HAL 128 includes a set of routines that emulate platform specific details that provide other software modules and applications access to hardware resources.

In the exemplary embodiment, L2 and L3 applications (apps) 130 include a plurality of L2 and L3 level applications that support graceful shutdown (i.e., all resources are freed, such as those indices allocated through GIM 118, and the hardware resources underpinning the control, data, and management planes are cleaned up before the application terminates). Apps 130 support a restart capability to provide high availability (HA) functionality (i.e., capability to back up and restart if failure occurs).

LSR-1 104 and LSR-2 106 are non-default LSRs created by a default LSR, such as LSR-0 102.

In the exemplary embodiment, the LSR environment includes hardware support (e.g., VRF, LN support on FDB, etc.) for traffic isolation between different LSRs on the data plane.

LSRA 110 is a software component functioning as an agent of LSRM 120 on every switch. LSRA 110 is a global process responsible for set up of the LSR environment on the control plane (such as jail and network namespace) of each switch. In the exemplary embodiment, LSRA 110 launches SMR 122 for each LSR, once the LSR is created.

PM 112 is a software module responsible for port management. PM 112 manages physical port and virtual port (i.e., channel) assignment in the LSR environment. A port database in shared memory (not shown) is maintained in PM 112. PM 112 is responsible for index assignment for hardware resources, such as LAG, multicast, spanning-tree-instance, etc., and is also responsible for enforcement of hardware resource policies for each LSR, such as LSR-1 104 and LSR-2 106. PM 112 is a global process with each switch having only one instance of PM 112 operating on it.

IA 114 is a software module responsible for managing mapping between logical interfaces (LIFs) and hardware ports. IA 114 is a global process with each switch having only one instance of IA 114 operating on it.

SDK 116 is a software module responsible for software development of the network chips in the LSR environment. SDK 116 is a global process with each switch having only one instance of SDK 116 operating on it.

GIM 118 is a software module responsible for index assignment for hardware resources such as LAG, multicast, spanning-tree-instance, etc. GIM 118 manages enforcement of hardware resource polices for one or more LSRs in the LSR system. GIM 118 is a global process with each switch having only one instance of GIM 118 operating on it.

LSR-0 102, LSR-1 104, and LSR-2 106 include multiple processes operating locally on each LSR.

Figure 2:
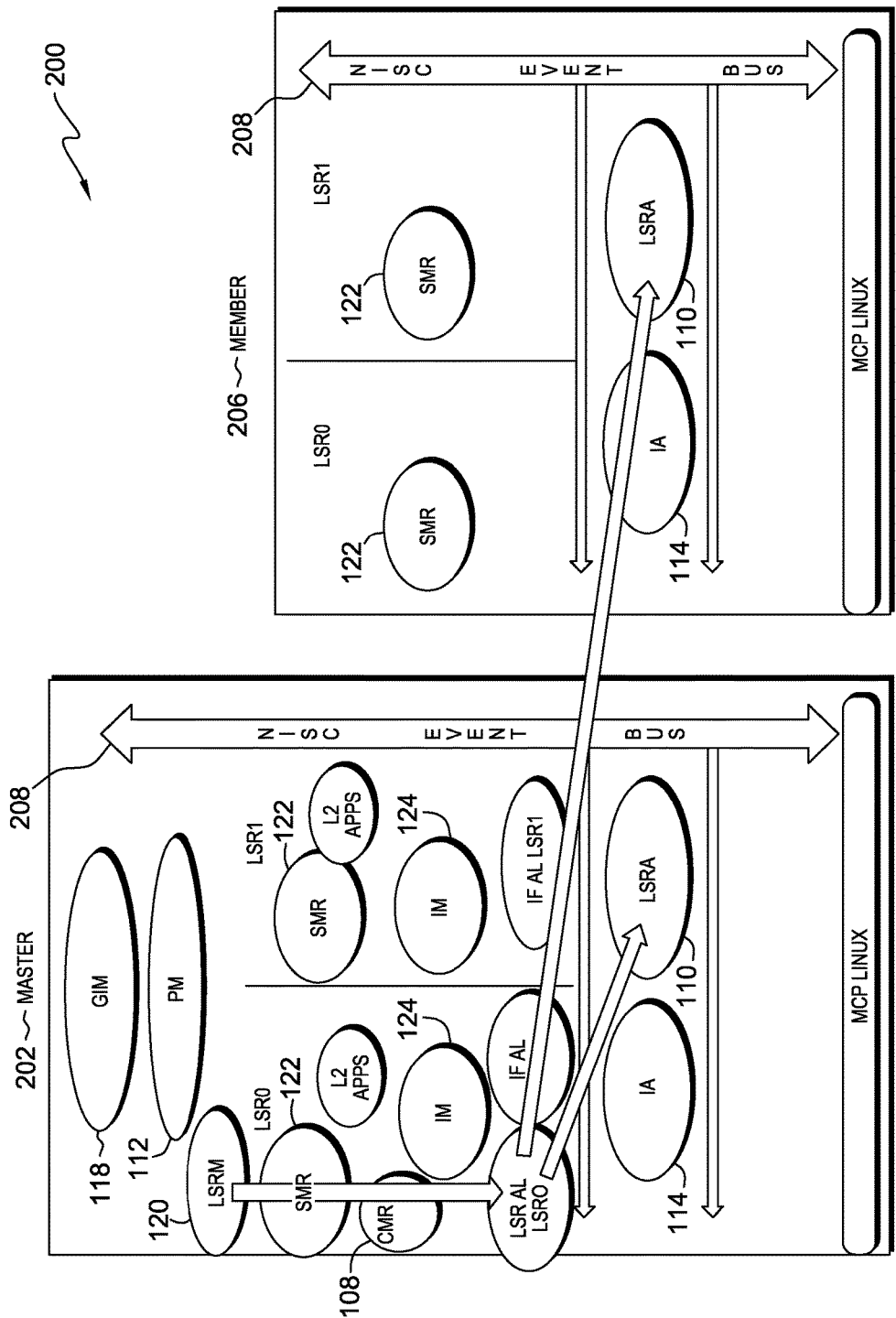
FIG. 2 is an exemplary illustration of a configuration diagram, generally designated 200, for LSR support for a distributed system, in accordance with an embodiment of the present invention.

FIG. 2 illustrates a configuration diagram, generally designated 200, for LSR support for a distributed system. In the exemplary embodiment, the LSR environment is replicated on all switches in a system where distributed application support is desired. In another embodiment, where there is no need to support distributed applications, the LSR environment is replicated on both the master and the backup switches.

In the exemplary embodiment, where the LSR environment will support distributed applications, logical switch management functionalities are separated into two modules: LSRM 120 and LSRA 110. LSRM 120, operating on master 202, performs a plurality of functions, including interfacing with CMR 108, PM 112, and LSRA 110, and maintaining a database (not shown) to manage LSR related information and states. LSRA 110, operating on both master 202 and member 206, provides the capability to interface with LSRM 120, set up the LSR environment (e.g., jail, network namespace, etc.) on each local switch, and launch service manager (SMR) 122 in each non-default LSR. In the exemplary embodiment, when a new switch joins the stack, LSRA 110 is one of a plurality of modules to first receive LSR data downloaded from LSRM 120 on master 202. In the exemplary embodiment, NISC 208 is a publication-subscription event bus for supporting communication between LSRM 120 and LSRA 110.

Figure 3:
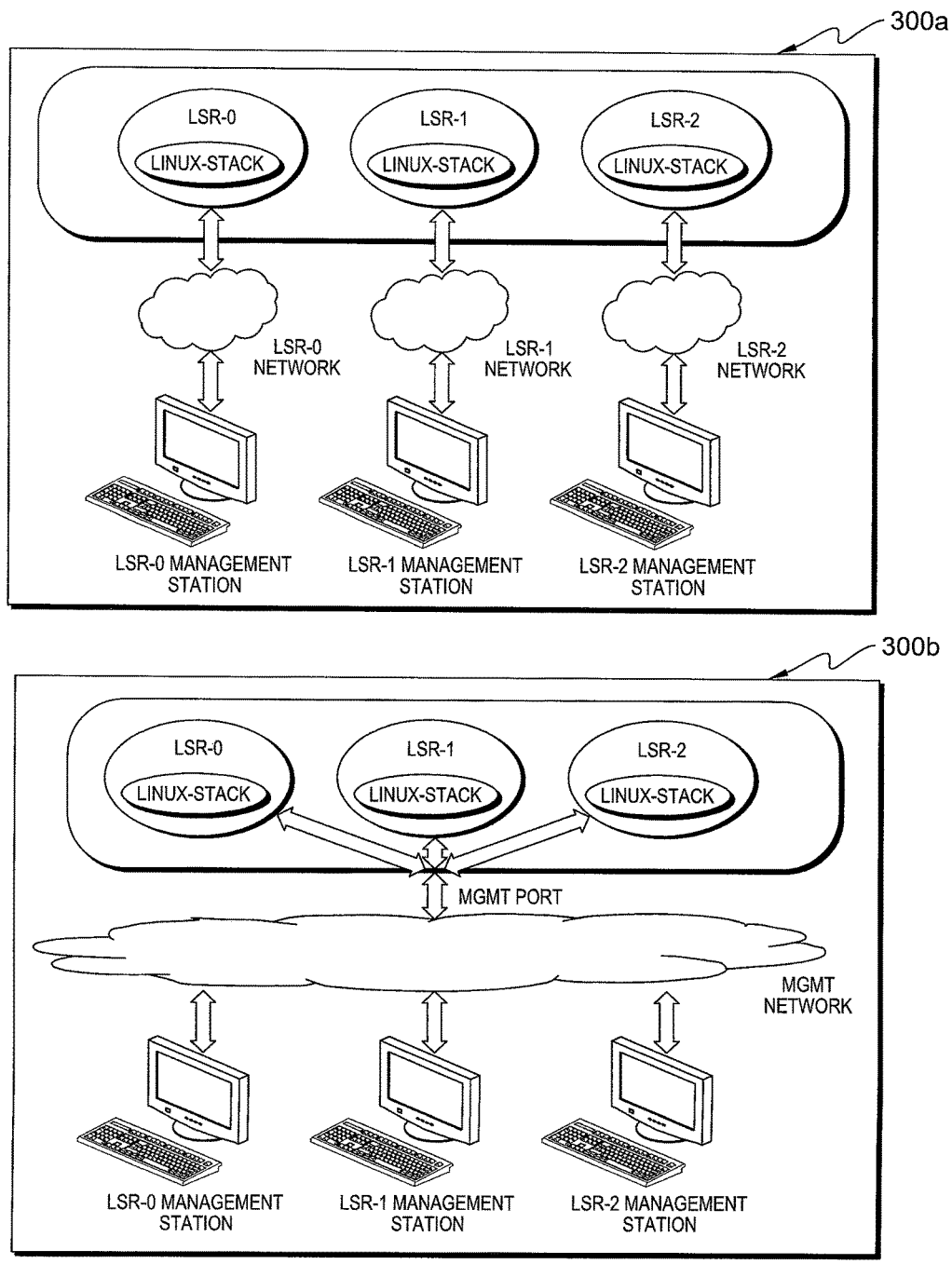
FIG. 3 is a functional block diagram illustrating an in-band, generally designated 300(a), and an out-of-band, generally designated 300(b), path for accessing a switch for management and configuration, in accordance with an embodiment of the present invention.

FIG. 3 is a functional block diagram illustrating an in-band, generally designated 300(*a*), and an out-of-band, generally designated 300(*b*), path for accessing a switch for management and configuration. In the exemplary embodiment an in-band path connects a user to the switch via a data port local to the switch. The data port may be defined by the IP address and network specific to the switch. In an in-band path, the user is directly connected to the CMR client within a particular LSR, and as such, the user can only manage that local LSR. However, if a user connects to the default LSR, such as LSR-0 102, and if the user has a high privilege level (i.e., super-admin), the user may be able to manage all LSRs. The in-band path provides separation of AAA servers and system log servers among LSRs.

In the exemplary embodiment, an out-of-band path connects a user to a switch via a common management port. Out-of-band path support can be provided by at least one of the following: a separate IP approach and a single IP approach. In the exemplary embodiment, the separate IP approach connects a user to a switch via a common management port by using a different IP and MAC address for each LSR. The IP address for each LSR may be configured by the super-admin in the default LSR via a "switch lsr" command in the CMR client. The admin for the newly created LSR will use the configured IP address to connect to that LSR for management and configuration. The MAC address for each LSR may be automatically assigned based on the base MAC address of the master switch. The separate IP approach for out-of-band path support may be provided through a kernel bridge. The separate IP approach provides separate management context for each LSR. In another embodiment, the single IP approach connects a user to a switch using one IP address on the management port, connecting all users to the default LSR. Through CMR 108, a user can connect automatically to a particular LSR depending upon the user configuration in the default LSR. Through simple network management protocol (SNMP), the context ID field in SNMP requests can be used to differentiate the LSR context targeted by a request. Similar to the in-band path, a user may be able to manage all LSRs provided that the user possesses a high privilege level. However, a user connected to a non-default LSR, such as LSR-1 104, the user can only manage local context on that LSR. For both in-band and out-of-band paths, user configurations are saved on a per LSR basis (i.e., the configurations for each LSR are stored in different files). The user configurations for the default LSR might need to include the user information for a non-default LSR if the single IP approach is taken for the out-of-band management.

Figure 4:
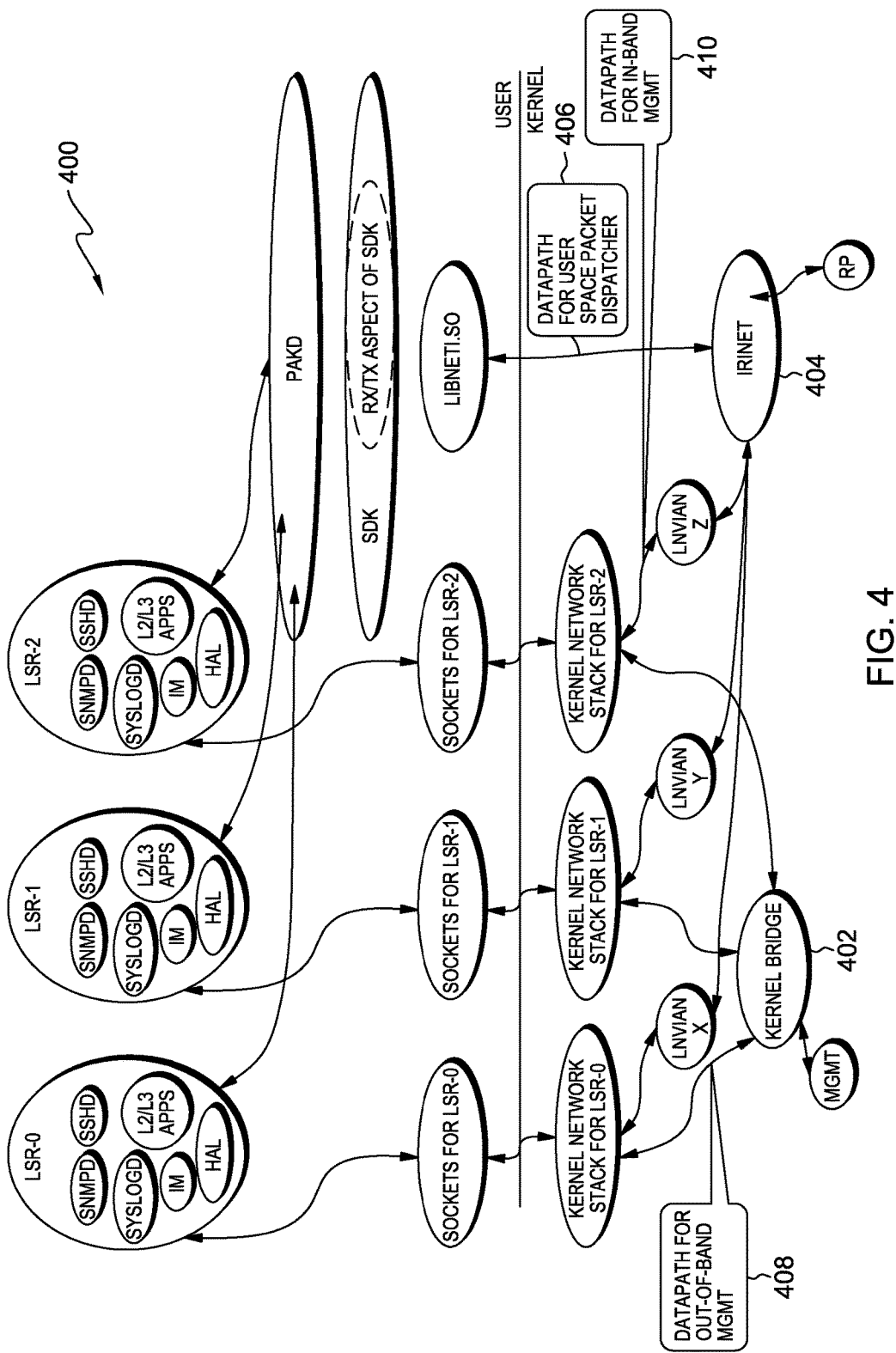
FIG. 4 is a functional flow diagram, generally designated 400, depicting a management packet I/O for LSR management, in accordance with an embodiment of the present invention.

FIG. 4 is a functional flow diagram, generally designated 400, depicting a management packet I/O for LSR management. In the exemplary embodiment, packet I/O management is achieved through one or more of the following approaches: transmission through kernel bridge 402 utilizing a data path for in-band management, transmission through kernel bridge 402 utilizing a data path for out-of-band management.

In the exemplary embodiment, for packet I/O transmission through kernel bridge 402, such as CPU-to-CPU communication traffic and communication traffic via a data path for in-band management, a user space packet dispatcher (IRINET) 404 utilizes LSR information, such as VRF data, to set up a net device accordingly. IRINET 404 dispatches ingress packets via data path 410 to proper net devices based on a plurality of predetermined criteria (e.g., ingress physical port or vport, DMAC of the packet, etc.). In the exemplary embodiment, VRF-aware net devices (e.g., Lnvlan x) are installed in kernel bridge 402 for both in-band management and CPU-to-CPU communication. In another embodiment, for out-of-band management, where a separate IP approach is used, a VRF-aware net device may be installed in kernel bridge 402 to facilitate packet I/O transmission.

In another embodiment, where out-of-band management for data transfer is used, kernel bridge 402 dispatches ingress packets via data path 408 to one or more kernel network stacks for transfer to their respective destination LSRs.

In the exemplary embodiment, for packet I/O transmission through IRINET 404, such as L2 traffic, IRINET 404 utilizes mapping between ingress ports, vports, and LIFs to determine the LSR to receive the packet, and dispatches ingress packets via data path 406. For FCoE traffic, a software router will sit on top of Pakd. Communication between the software router and Pakd may be achieved through a NISC event bus.

Figure 5:
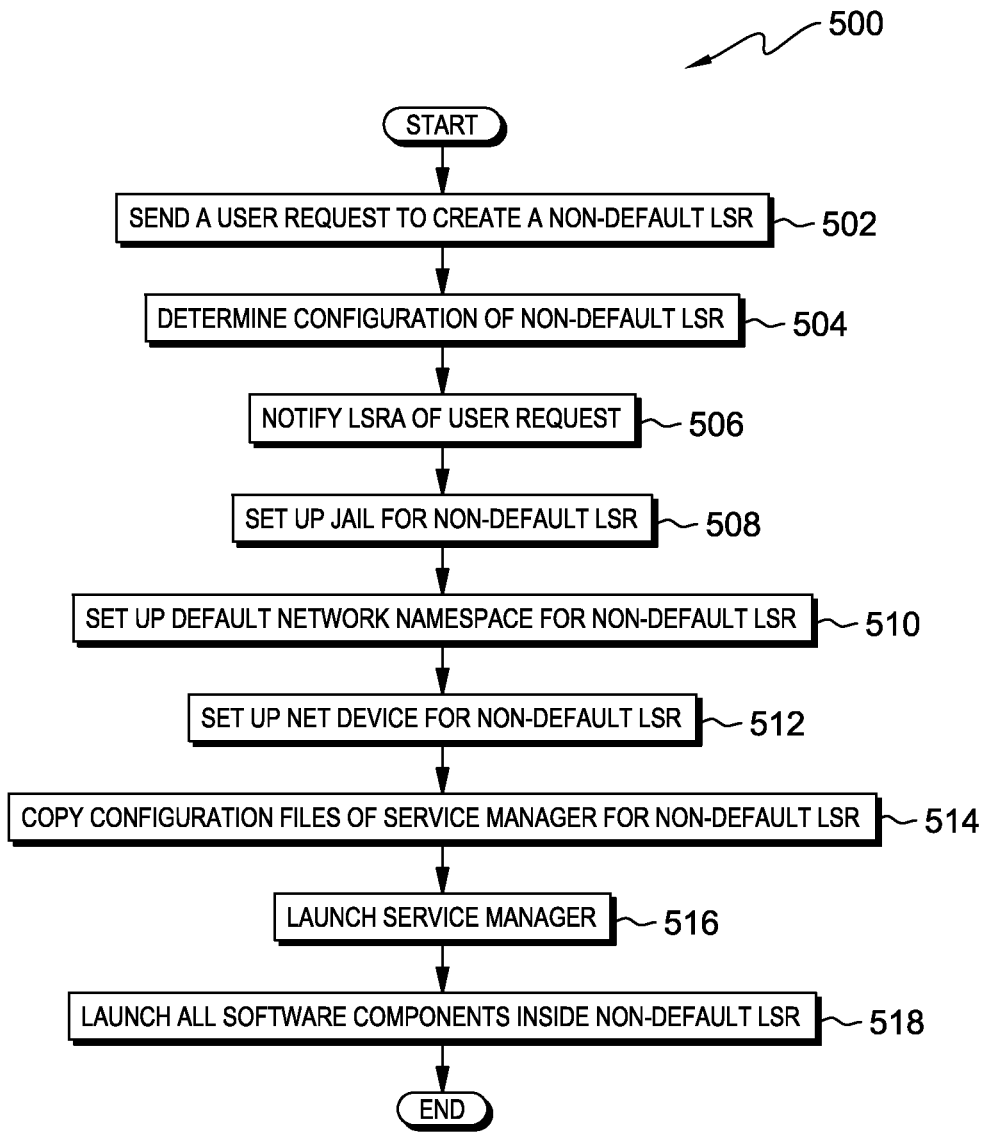
FIG. 5 is a flowchart, generally designated 500, depicting the steps for creating a non-default LSR, such as LSR-1-104, in the LSR environment of FIG. 1, in accordance with an embodiment of the present invention.

FIG. 5 is a flowchart, generally designated 500, depicting the steps for creating a non-default LSR, such as LSR-1-104, in the LSR environment of FIG. 1. In the exemplary embodiment, LSRM 120 receives a user request to create a non-default LSR from CMR 108 (step 502). CMR 108, to create the non-default LSR, uses a create command (config-t)# lsr {<lsr-name>}. For example, to create a non-default LSR for a company, such as Company1, CMR 108 uses the create command (config-t)# lsr company1 to create the non-default LSR. CMR 108 sends the user request, including the create command, the LSR name (e.g., company1), and resource management policies, to LSRM 120.

In response to CMR 108 sending the user request to create the non-default LSR, LSRM 120 determines configuration details of the non-default LSR by communicating with CMR 108 (step 504). LSRM 120 communicates with CMR 108 to determine configuration details including, but not limited to, a LSR name for the non-default LSR and resource management policies for the non-default LSR. The LSR name and the resource management policies for the non-default LSR may be configured by a user submitting the request to create the non-default LSR, or by one or more computer processors. LSRM 120 may also determine a MAC address, as provided by the platform manager, based on the base MAC address of the master switch.

In response to LSRM 120 determining configuration details of the non-default LSR, LSRM 120 notifies LSRA 110 of the user request to create the non-default LSR (step 506).

In response to LSRM 120 notifying LSRA 110 of the user request to create the non-default LSR, LSRA 110 sets up a jail for the non-default LSR (step 508). In the exemplary embodiment, LSRA 110 utilizes the configuration details for the non-default LSR to set up the jail for the non-default LSR.

In response to LSRA 110 setting up the jail for the non-default LSR, LSRA 110 sets up a default network namespace for the non-default LSR (step 510).

In response to LSRA 110 setting up the default network namespace for the non-default LSR, an interface agent (IA) sets up a net device for the non-default LSR (step 512).

In response to the interface agent setting up net devices for the non-default LSR, LSRA 110 copies configuration files of SMR 122 for the non-default LSR (step 514).

In response to LSAR 110 copying the configuration files or SMR 122 for the non-default LSR, LSRA 110 launches SMR 122 (step 516).

In response to LSRA 110 launching SMR 122, SMR 122 launches all software components inside the non-default LSR (step 518). In the exemplary embodiment, SMR 122 launches a plurality of software components inside the non-default LSR, including, but not limited to, L2 level applications, to enable functionality of the non-default LSR.

In another embodiment, creation of non-default LSRs may be fully automated. For example, a command may be provided in the LSR configuration context to allow a super-administrator to specify a startup configuration file for a non-default LSR, such as "load startup-config <resource-uri>", where the "resource-uri" can be either a local or a remote configuration file, such as "localhost:/etc/configs/startup," or "remoteserver.com://tftpboot/startup-config." The startup configuration file (i.e., load command) may apply during the creation of a new non-default LSR. Where the startup configuration file is located on a remote server, the startup configuration file may be loaded in LSR0 context. The startup configuration file may be passed to the non-default LSR once it is created, i.e., the commands issued in the LSR config-t mode take effect after exiting the mode. Where the non-default LSR already exists, the load command will not take effect.

Figure 6:
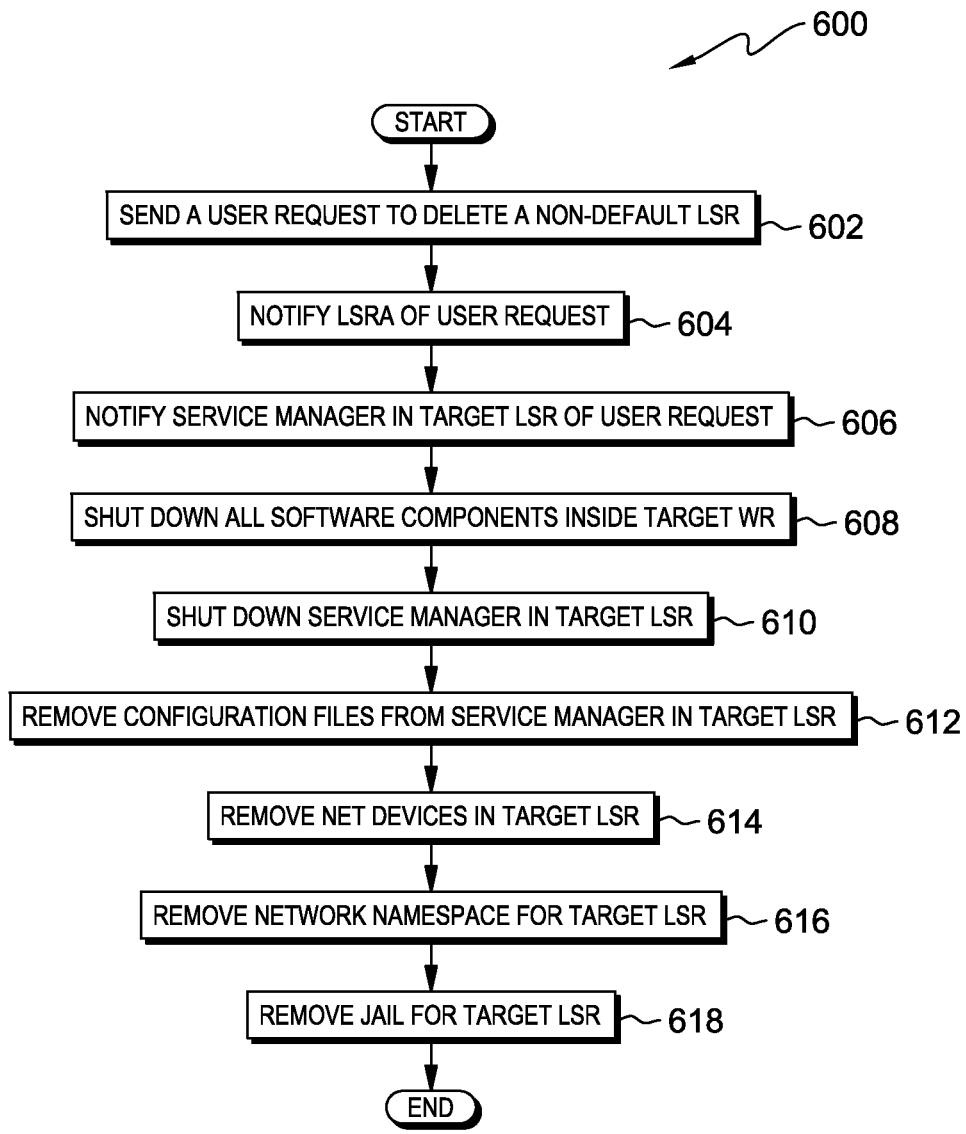
FIG. 6 is a flowchart, generally designated 600, depicting the steps for deleting a non-default LSR, such as LSR-2-106, in the LSR environment of FIG. 1, in accordance with an embodiment of the present invention.

FIG. 6 is a flowchart, generally designated 600, depicting the steps for deleting a non-default LSR, such as LSR-2-106, in the LSR environment. In the exemplary embodiment, LSRM 120 receives a user request to delete a non-default LSR from (step 602). CMR 108, to delete the non-default LSR, uses a delete command "(config-t)# [no] lsr {<lsr-name>}." For example, to delete a non-default LSR for a company, such as Company1, CMR 108 uses the delete command "(config-t)#1 lsr company1" to delete the non-default LSR. CMR 108 sends the user request, including the delete command, the LSR name (e.g., company1), and resource management policies, to LSRM 120.

In response to CMR 108 sending the user request to delete the non-default LSR, LSRM 120 notifies LSRA 110 of the user request to delete the non-default LSR (step 604).

In response to LSRM 120 notifying LSRA 110 of the user request to delete the non-default LSR, LSRA 110 notifies SMR 122 inside the non-default LSR to be deleted (target LSR) of the user request to delete the non-default LSR (step 606).

In response to LSRA 110 notifying SMR 122 inside the target LSR of the user request to delete the non-default LSR, SMR 122 initiates a graceful shutdown of all software components inside the target LSR (step 608).

In response to SMR 122 initiating the shutdown of all software components inside the target LSR, LSRA 110 initiates shutdown of SMR 122 (step 610).

In response to LSRA 110 initiating shutdown of SMR 122, LSRA 110 removes configuration files of SMR 122 for the target LSR (step 612).

In response to LSRA 110 removing configuration files of SMR 122 for the target LSR, an interface agent removes the net devices for the target LSR (step 614).

In response to removing net devices for the target LSR, LSRA 110 removes the network namespace for the target LSR (step 616).

In response to LSRA 110 removing the network namespace for the target LSR, LSRA 110 removes the jail for the target LSR (step 618).

Figure 7:
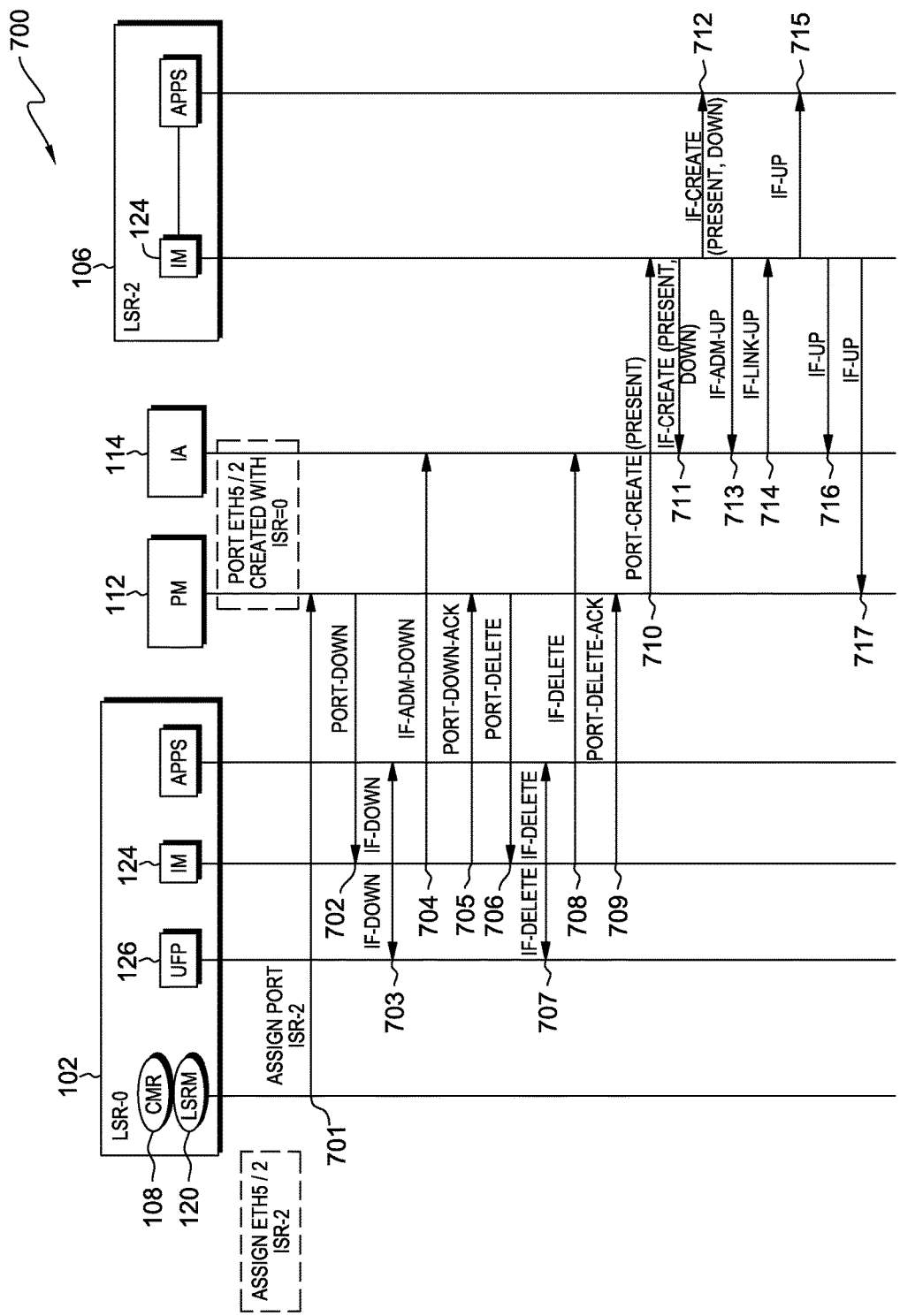
FIG. 7 depicts a functional flow diagram, generally designated 700, illustrating the assignment of a physical port in an LSR environment, where the physical port, eth5/2, has already been created in LSR-0 102, in accordance with an embodiment of the present invention.

FIG. 7 depicts a functional flow diagram, generally designated 700, illustrating an assignment of a physical port in an LSR environment, where the physical port, eth5/2, has already been created in LSR-0 102.

In the exemplary embodiment, a user issues a command to CMR 108 to assign a physical port, such as eth5/2, to a non-default LSR, such as LSR-2 106, from a default LSR, such as LSR-0 102. CMR 108 sends the command to assign the physical port to LSRM 120 in LSR-0 102 for processing.

In response to CMR 108 sending the command to assign the physical port to LSRM 120 for processing, LSRM 120 accepts the command to assign the physical port and sends a message, "assign-port(eth5/2,LSR-2)" to PM 112 for processing (step 701). In the exemplary embodiment, LSRM 120 updates its local database, confirming the message has been sent to PM 112.

In response to LSRM 120 sending the message to PM 112, PM 112 updates its local database, confirming the message has been received, and sends a message "port-down(eth5/2)" to IM 124, in LSR-0 102 (step 702).

In response to PM 112 sending the message to IM 124 in LSR-0 102, IM 124 in LSR-0 102 updates its local database, confirming the message has been received, and sends a message "interface-down(eth5/2)" to all applications in LSR-0 102 (step 703).

IM 124 in LSR-0 102 sends a message "interface-admin-down(eth5/2)" to IA 114 (step 704). IA 114 turns off the link on the physical port eth5/2 in the hardware.

In response to IM 124 in LSR-0 102 sending the message to IA 114, IM 124 in LSR-0 102 sends a message "port-down-ack(eth5/2)" to PM 112 (step 705).

In response to IM 124 in LSR-0 102 sending the message to PM 112, PM 112, upon receipt of the message, sends a message "port-delete(eth5/2)" to IM 124 in LSR-0 102 (step 706).

In response to PM 112 sending the message to IM 124 in LSR-0 102, IM 124 in LSR-0 102 updates its local database, confirming the message has been received, and sends a message "interface-delete(eth5/2)" to all applications in LSR-0 102 (step 707). All applications in LSR-0 102 perform a clean up accordingly.

IM 124 in LSR-0 102 sends a message "interface-delete (eth5/2)" to IA 114 (step 708). In response to receiving the message from IM 124 in LSR-0 102, IA 114 deletes the specified interface.

IM 124 in LSR-0 102 sends a message "port-delete-ack (eth5/2)" to PM 112 (step 709).

In response to IM 124 in LSR-0 102 sending the message to PM 112, PM 112, upon receipt of the message, sends a message "port-create(eth5/2, hardware-present)" to IM 124 in LSR-2 106 (step 710).

IM 124 in LSR-2 106 sends a message "interface-create (eth5/2, hardware-present, link-down)" to IA 114 (step 711). IA 114 creates the interface accordingly.

IM 124 in LSR-2 106 sends a message "interface-create (eth5/2, hardware-present, link-down)" to all applications (step 712). Applications create the interface, and take proper actions to configure the interface, accordingly.

IM 124 in LSR-2 106 sends a message "interface-admin-up(eth5/2) to IA 114, where the user configuration for eth5/2 is "no shut" (step 713). IA 114 turns on the link on the port in the hardware accordingly.

In response to the link up from the hardware, IA 114 sends a message "interface-link-up(eth5/2)" to IM 124 in LSR-2 106 (step 714).

In response to IA 114 sending the message to IM 124 in LSR-2 106, IM 124 in LSR-2 106 sends a message "interface-up(eth5/2)" to all applications in LSR-2 106 (step 715) and IA 114 (step 716). Each application performs proper actions accordingly and IA 114 updates interface status on its local database.

IM 124 in LSR-2 106 sends a message "interface-up(eth5/2)" to PM 112 (step 717). PM 112 updates its local database accordingly.

Figure 8:
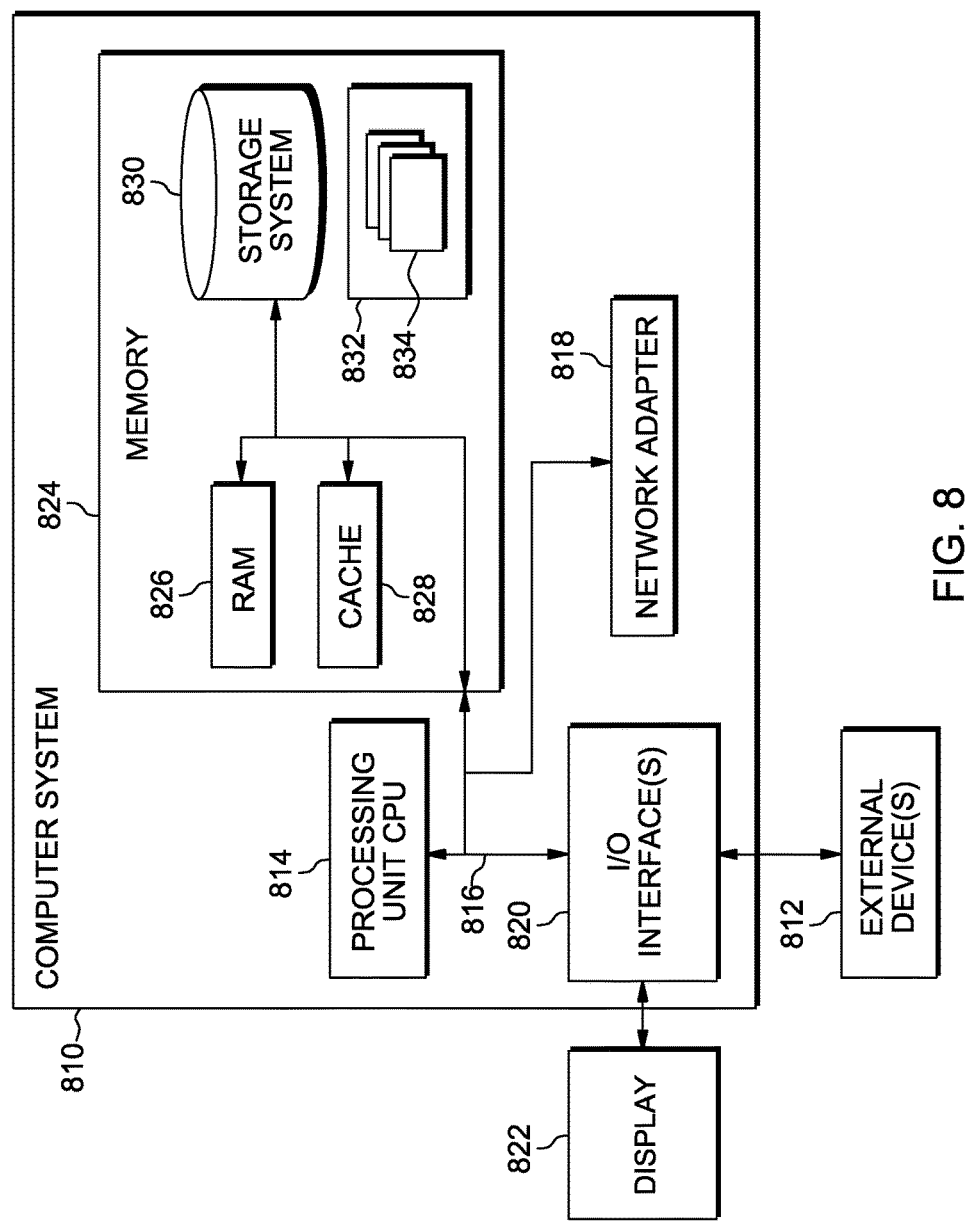
FIG. 8 depicts a block diagram of components of data processing system 100, in accordance with an embodiment of the present invention.

FIG. 8 depicts a block diagram of components of data processing system 100, in accordance with an illustrative embodiment of the present invention. It should be appreciated that FIG. 8 provides only an illustration of one implementation and does not imply any limitations with regard to the environments in that different embodiments may be implemented. Many modifications to the depicted environment may be made.

Computer system 810 in data processing system 100 is shown in the form of a general-purpose computing device. The components of computer system 810 may include, but are not limited to, one or more processors or processing units 814, a system memory 824, and a bus 816 that couples various system components including system memory 824 to processor 814.

Bus 816 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 810 typically includes a variety of computer system readable media. Such media may be any available media that is accessible by computer system 810, and it includes both volatile and non-volatile media, removable and non-removable media.

System memory 824 can include computer system readable media in the form of volatile memory, such as random access memory (RAM) 826 and/or cache memory 828. Computer system 810 may further include other removable/non-removable, volatile/non-volatile computer system storage media. By way of example only, storage system 830 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 816 by one or more data media interfaces. As will be further depicted and described below, system memory 824 may include at least one computer program product having a set (e.g., at least one) of program modules that are configured to carry out the functions of embodiments of the invention.

Program/utility 832, having one or more sets of program modules 834, may be stored in memory 824 by way of example, and not limitation, as well as an operating system, one or more application programs, other program modules, and program data. Each of the operating systems, one or more application programs, other program modules, and program data, or some combination thereof, may include an implementation of a networking environment. Program modules 834 generally carry out the functions and/or methodologies of embodiments of the invention as described herein. Computer system 810 may also communicate with one or more external devices 812 such as a keyboard, a pointing device, a display 822, etc., one or more devices that enable a user to interact with computer system 810 and any devices (e.g., network card, modem, etc.) that enable computer system 810 to communicate with one or more other computing devices. Such communication can occur via input/output (110) interfaces 820. Still yet, computer system 810 can communicate with one or more networks such as a local area network (LAN), a general wide area network (WAN), and/or a public network (e.g., the Internet) via network adapter 818. As depicted, network adapter 818 communicates with the other components of computer system 810 via bus 816. It should be understood that although not shown, other hardware and software components, such as microcode, device drivers, redundant processing units, external disk drive arrays, RAID systems, tape drives, and data archival storage systems may be used in conjunction with computer system 810.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system with a logical switch architecture for network virtualization, the computer system comprising:
   one or more computer processors;
   one or more computer readable storage media;
   program instructions stored on the one or more computer readable storage media for execution by at least one of the one or more computer processors, the program instructions comprising;
   a software module configured to manage a default logical switch router in the logical switch architecture;
   a software module configured to duplicate the logical switch architecture on a non-default logical switch router, including:
   receiving, at the default logical switch router, a request to create a non-default logical switch router, the request containing configuration details including a create command, a name for the non-default logical switch router, and one or more resource management policies;
   creating the non-default logical switch router, including:
   determining, by the default logical switch router, a MAC address for the non-default logical switch router,
   setting up a logical switch router environment for the non-default logical switch router, utilizing the configuration details,
   setting up a default network namespace for the non-default logical switch router,
   setting up a net device for the non-default logical switch router,
   creating a copy of configuration files for a launch service manager of the non-default logical switch router,
   initiating the launch service manager of the non-default logical switch router, and
   launching all software components of the non-default logical switch router, utilizing the launch service manager of the non-default logical switch router;
   a software module configured to coordinate ownership of one or more physical ports and one or more virtual ports to the default logical switch router and the non-default logical switch router within the logical switch architecture, wherein each of the one or more physical ports individually do not belong to more than one logical switch router at any given time, wherein each of the one or more virtual ports individually do not belong to more than one logical switch router at any given time, and wherein the one or more physical ports are individually assigned to the default logical switch router until assigned to the non-default logical switch router; and a software module configured to coordinate resources across the default logical switch router and the non-default logical switch router within the logical switch architecture.

2. The computer system of claim 1, wherein the software module that is configured to manage the default logical switch router in the logical switch architecture is further configured to:

interface with a software module configured to receive one or more user requests, the one or more user requests comprising:
the request to create the non-default logical switch router;
a user request to assign at least one of the one or more physical ports;
a user request to assign at least one of the one or more virtual ports; and
a user request to delete the non-default logical switch router.

3. The computer system of claim 1, wherein the software module that is configured to manage the default logical switch router in the logical switch architecture is further configured to:

prevent direct communications between any two logical switch routers via a data plane on a same switch in a network of switches;
interface with the software module configured to duplicate the logical switch architecture on the one or more switches in the network of switches; and
save user configurations on a per logical switch router basis in separate files accessible to the default logical switch router.

4. The computer system of claim 1, wherein
the default logical switch router comprises a universal arbitrated fiber port configured to communicate with and connect to the one or more physical ports.

5. The computer system of claim 1, wherein the software module configured to coordinate ownership of the one or more physical ports and the one or more virtual ports to the default logical switch router and the non-default logical switch router within the logical switch architecture is further configured to interface with one or more software modules within the logical switch architecture to manage assignment of the one or more physical ports and the one or more virtual ports to the non-default logical switch router within the logical switch architecture.

6. The computer system of claim 1, wherein the software module configured to coordinate resources across the default logical switch router and the non-default logical switch router within the logical switch architecture is further configured to:

manage a plurality of hardware resource policies and a resource assignment status; and
manage index assignment for hardware resources of one or more switches in a network of switches.

7. A method for partitioning a switch into one or more logical switches in a distributed system, the method comprising:

receiving, at a default logical switch router, a request to create a non-default logical switch router, the request containing configuration details including a create command, a name for the non-default logical switch router, and one or more resource management policies;

creating, by one or more computer processors, a non-default logical switch router, including:
determining, by the default logical switch router, a MAC address for the non-default logical switch router,
setting up a logical switch router environment for the non-default logical switch router, utilizing the configuration details,
setting up a default network namespace for the non-default logical switch router,
setting up a net device for the non-default logical switch router,
creating a copy of configuration files for a launch service manager of the non-default logical switch router,
initiating the launch service manager of the non-default logical switch router, and
launching all software components of the non-default logical switch router, utilizing the launch service manager of the non-default logical switch router;

receiving a request to assign a physical port from the default logical switch router to the non-default logical switch router;
assigning, by the one or more computer processors, the physical port from the default logical switch router to the non-default logical switch router,
wherein the physical port does not belong to more than one logical switch router at any given time, and wherein the physical port is individually assigned to the default logical switch router until assigned to the non-default logical switch router; and
managing, by the one or more computer processors, the default logical switch router and the non-default logical switch router.

8. The method of claim 7, wherein assigning, by the one or more computer processors, the physical port from the default logical switch router to the non-default logical switch router includes:

sending the request to assign the physical port to the default logical switch router,
sending an assignment message from the default logical switch router to a port manager,
sending a port-down message from the port manager to an interface manager of the default logical switch router,
sending an interface-down message from the interface manager of the default logical switch router to all applications within the default logical switch router,
sending an interface-admin-down message from the default logical switch router to an interface agent,
turning off, by the interface agent, a link on the physical port in hardware,
sending a port down acknowledgement from the default logical switch router to a port manager,
sending a port delete message from the port manager to the interface manager of the default logical switch router,
sending an interface-delete message from the interface manager of the default logical switch router to all applications within the default logical switch router, as well as the interface agent,
deleting, by the interface agent, an interface for the physical port, sending a port-create message from the port manager to an interface manager of the non-default logical switch router, sending an interface-create message from the interface manager of the non-default logical switch router to all applications within the non-default logical switch router, as well as the interface agent, creating, by the interface agent, the interface for the physical port, creating and configuring, by all applications within the non-default logical switch router, the interface for the physical port, and turning on, by the interface agent, the link on the physical port in hardware.

9. The method of claim 7, wherein creating the non-default logical switch router further comprises:
 determining, by the one or more computer processors, a default network for the non-default logical switch router; and
 copying, by the one or more computer processors, one or more configuration files for the non-default logical switch router to a software module configured to manage the non-default logical switch router in the distributed system.

10. The method of claim 7, further comprising preventing direct communications via a data plane between any two logical switch routers that are created on a same switch.

11. The method of claim 7, wherein creating the non-default logical switch router further comprises:
 upon receiving a request to start a distributed process, sending a request to the non-default logical switch router to launch the distributed process.

12. The method of claim 7, wherein the request to assign the physical port includes one or more resources to assign selected from a group comprising:
 one or more ports to assign; and
 the non-default logical switch router to assign to the one or more ports.

13. The method of claim 7, wherein assigning the physical port to the non-default logical switch router further comprises sending, by the one or more computer processors, messages to one or more software modules responsible for assigning the physical port to the non-default logical switch router, the one or more software modules responsible for assigning the physical port being located on the default logical switch router.

14. A computer program product for partitioning a switch into one or more logical switches in a distributed system, the computer program product comprising:
 one or more non-transitory computer-readable storage media having program instructions stored therewith, the program instructions being executable by one or more computer processors to cause the one or more computer processors to:
  receive, at a default logical switch router, a request to create a non-default logical switch router, the request containing configuration details including a create command, a name for the non-default logical switch router, and one or more resource management policies;
  create, by the one or more computer processors, the non-default logical switch router, including:
   determining, by the default logical switch router, a MAC address for the non-default logical switch router,
   setting up a logical switch router environment for the non-default logical switch router, utilizing the configuration details,
   setting up a default network namespace for the non-default logical switch router,
   setting up a net device for the non-default logical switch router,
   creating a copy of configuration files for a launch service manager of the non-default logical switch router,
   initiating the launch service manager of the non-default logical switch router, and
   launching all software components of the non-default logical switch router, utilizing the launch service manager of the non-default logical switch router;
  receiving a request to assign a physical port from the default logical switch router to the non-default logical switch router;
  receive a request to assign a physical port from the default logical switch router to the non-default logical switch router;
  assign, by the one or more computer processors the physical port from the default logical switch router to the non-default logical switch router, wherein the physical port does not belong to more than one logical switch router at any given time, and wherein the physical port is assigned to the default logical switch router until assigned to one of non-default logical switch router; and
  manage, by the one or more computer processors, the non-default logical switch router.

15. The computer program product of claim 14, wherein assigning, by the one or more computer processors, the physical port from the default logical switch router to the non-default logical switch router includes:
 sending the request to assign the physical port to the default logical switch router,
 sending an assignment message from the default logical switch router to a port manager,
 sending a port-down message from the port manager to an interface manager of the default logical switch router,
 sending an interface-down message from the interface manager of the default logical switch router to all applications within the default logical switch router,
 sending an interface-admin-down message from the default logical switch router to an interface agent,
 turning off, by the interface agent, a link on the physical port in hardware,
 sending a port down acknowledgement from the default logical switch router to a port manager,
 sending a port delete message from the port manager to the interface manager of the default logical switch router,
 sending an interface-delete message from the interface manager of the default logical switch router to all applications within the default logical switch router, as well as the interface agent,
 deleting, by the interface agent, an interface for the physical port,
 sending a port-create message from the port manager to an interface manager of the non-default logical switch router,
 sending an interface-create message from the interface manager of the non-default logical switch router to all applications within the non-default logical switch router, as well as the interface agent, creating, by the interface agent, the interface for the physical port, creating and configuring, by all applications within the non-default logical switch router, the interface for the physical port, and turning on, by the interface agent, the link on the physical port in hardware.

16. The computer program product of claim 14, wherein the program instructions executable by the one or more computer processors to create the non-default logical switch router further causes the one or more computer processors to:

determine, by the one or more computer processors, a default network for the non-default logical switch router; and copy, by the one or more computer processors, one or more configuration files for the non-default logical switch router to a software module configured to manage the non-default logical switch router in the distributed system.

17. The computer program product of claim 14, wherein the program instructions executable by the one or more computer processors to manage the non-default logical switch router further causes the one or more computer processors to prevent, by the one or more computer processors, direct communications via a data plane between any two non-default logical switch routers that are created on a same switch.

18. The computer program product claim 14, wherein the program instructions executable by the one or more computer processors to create the non-default logical switch router further causes the one or more computer processors to:

upon receiving a request to start a distributed process, send, by the one or more computer processors, a request to the non-default logical switch router to launch the distributed process.

19. The computer program product of claim 14, wherein the program instructions executable by the one or more computer processors to assign the request to assign the physical port includes one or more resources to assign selected from a group comprising:

one or more ports to assign; and the non-default logical switch router to assign to the one or more ports.

20. The computer program product of claim 14, wherein the program instructions executable by the one or more computer processors to assign the physical port to the non-default logical switch router further causes the one or more computer processors to send, by the one or more computer processors, messages to one or more software modules responsible for assigning the physical port to the non-default logical switch router, the one or more software modules responsible for assigning the physical port being located on the default logical switch router.

* * * * *